United States Patent [19]

Anton et al.

[11] Patent Number: 5,388,818
[45] Date of Patent: Feb. 14, 1995

[54] NEAR VERTICAL MEDIA RECEIVE MAGAZINE

[75] Inventors: Christopher J. Anton, Rosemount; Wayne A. Pickett, Blaine, both of Minn.

[73] Assignee: Minnesota Mining and Manufacturing Company, St. Paul, Minn.

[21] Appl. No.: 220,886

[22] Filed: Mar. 31, 1994

[51] Int. Cl.⁶ ............................................. B65H 31/00
[52] U.S. Cl. ......................................... 271/209; 271/1; 271/220; 206/455; 354/276; 378/188
[58] Field of Search ............... 271/1, 207, 209, 220; 206/455; 354/276, 281; 378/182, 188

[56] References Cited

U.S. PATENT DOCUMENTS

| | | | |
|---|---|---|---|
| 3,934,735 | 1/1976 | Schmidt | 206/455 X |
| 4,995,602 | 2/1991 | Nakadai et al. | 271/207 |
| 5,172,905 | 12/1992 | Vanous et al. | 271/209 |

FOREIGN PATENT DOCUMENTS

| | | | |
|---|---|---|---|
| 2569669 | 3/1986 | France | 271/209 |
| 104936 | 6/1985 | Japan | 354/276 |
| 114840 | 6/1985 | Japan | 354/276 |
| 103146 | 5/1986 | Japan | 378/188 |
| 154040 | 6/1989 | Japan | 378/182 |
| 321251 | 12/1989 | Japan | 271/207 |
| 39255 | 2/1992 | Japan | 271/207 |

Primary Examiner—Joseph E. Valenza
Assistant Examiner—Boris Milef
Attorney, Agent, or Firm—Gary L. Griswold; Walter N. Kirn; William D. Bauer

[57] ABSTRACT

A receive magazine configured to be positioned in a generally upright, vertical orientation for passively collecting a plurality of flexible sheets of media. The top wall of the enclosure has a collection door in the top wall of a light-tight enclosure allows sheets of media to be passively received within the magazine. A contoured plate is hinged along a hinge line near the collection door on a non-stacked side of the enclosure. The plate is planar near the hinge line and is non-planar at an end of the plate opposite from the hinge line. A biasing mechanism is positioned near the collection door for resiliently biasing the plurality of flexible sheets of media laterally toward the non-stacking side of the enclosure biasing the plate away from the non-stacking side of the enclosure. Thus, the plurality of flexible sheets of media can be passively received through the collection door stacks, can contact the plate and can stack on the stacking side of the enclosure with a stack of the plurality of flexible sheets of media being contoured as determined by the non-planar portion of the contoured plate.

18 Claims, 6 Drawing Sheets

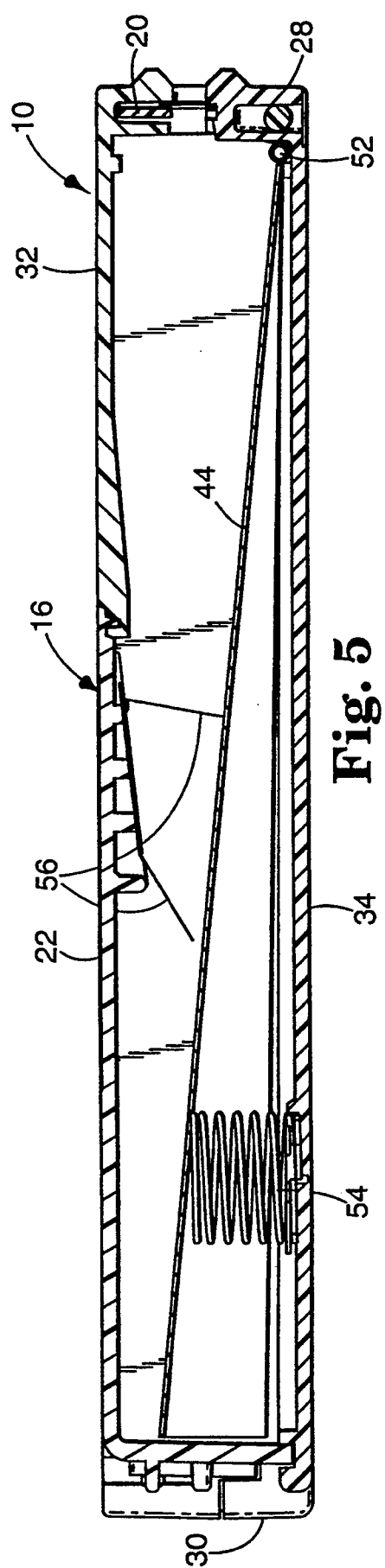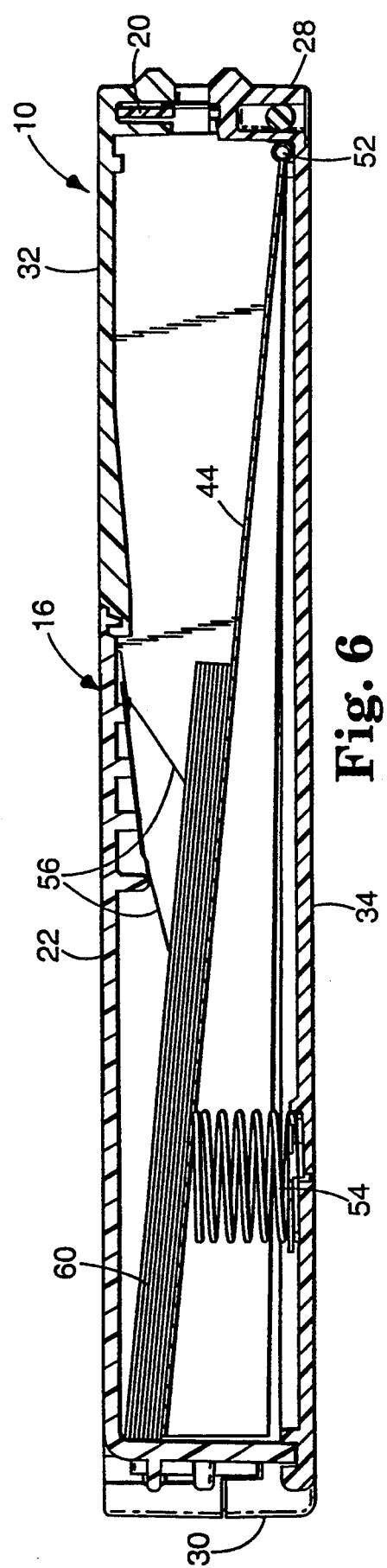

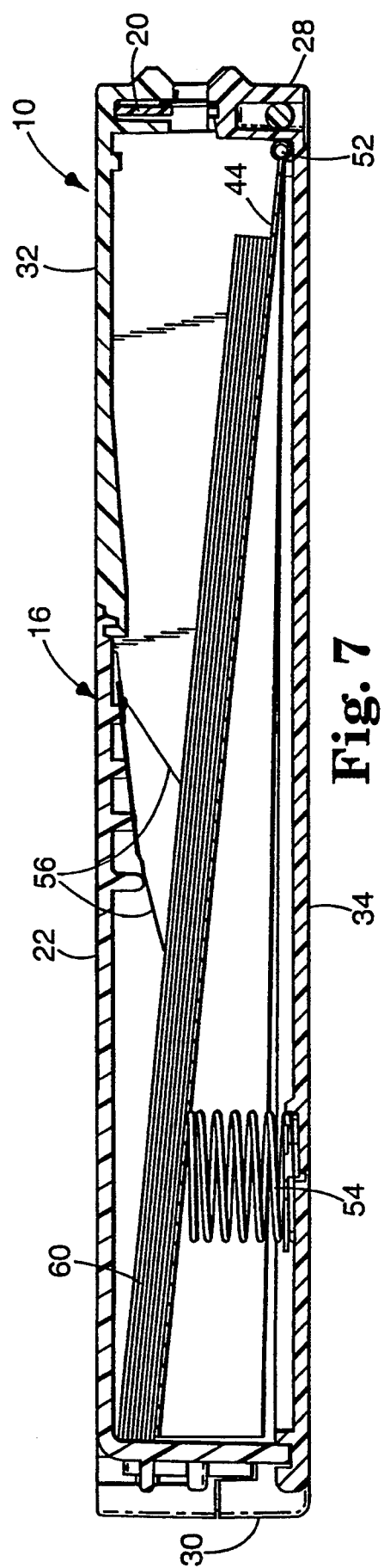

NEAR VERTICAL MEDIA RECEIVE MAGAZINE

TECHNICAL FIELD

The present invention relates generally to containers for photosensitive and other media and, more particularly, to receive magazines for passively receiving such media in a near vertical orientation.

BACKGROUND OF THE INVENTION

Laser imaging systems are commonly used to produce photographic images from digital image input data generated by magnetic resonance (MR), computed tomography (CT) or other types of scanners. After the photosensitive media, typically photosensitive film, has been imaged in the laser imaging system, it is typically transported to a developing station, known as a processor, by one of two approaches. The first approach is to use a mechanical transport system attached to the laser imaging system. The second approach is to use a light-tight receive magazine for collecting the imaged media within the laser imaging system. The receive magazine can then be removed from the laser imaging system and functions as a transporter for the media to the physical location of the media processor.

Commercially available receive magazines used with laser imaging systems (laser imagers) distributed by Minnesota Mining and Manufacturing Company, St. Paul, Minn., the assignee of the present invention, include two rectangular metal sections connected together at one end by hinges. A magazine of this type is loaded into the magazine compartment of the laser imager at an angle of about 30° off vertical. The upper section of the magazine is opened in a clam-shell-like manner to permit access to the inside of the magazine. Imaged sheets of film are fed into the opened magazine and dropped into the lower section. A spring biased plate pivotally mounted to the upper end of the upper magazine section engages the collected sheets of film and secures them in place when the magazine is closed. The laser imager includes mechanisms and associated control systems for opening and closing the receive magazine within the magazine compartment.

The received magazine described above has a number of drawbacks. The compartment in which the magazine is loaded must be larger than the magazine itself so that the magazine can be opened. Sheets of imaged film dropped into the magazine slide on one another. This contact can scratch the film. Film contact during collection can also generate static electricity which causes the sheets of film to cling to one another. Such a film magazine is also configured to received only 14 inch (35.5 centimeters)×17 inch (43.2 centimeters) film media.

U.S. Pat. No. 5,172,905, Vanuous et al, Film Receive Magazine for a Laser Imager, assigned to Minnesota Mining and Manufacturing Company, the assignee of the present invention, describes a near vertical film receive magazine for collecting and transporting sheets of exposed photographic media. The elongated light-tight enclosure receives gravity fed sheets of media. A lower downwardly sloped resilient member mounted to the front wall engages the sheets as they are inserted into the magazine and forces the sheets into a vertically stacked arrangement against the back wall of the enclosure. A ramp surface on the back wall guides sheets being inserted over previously collected sheets. A compound curved surface on the back wall of the enclosure below the ramp surface arcs the sheets to reduce contact during insertion.

A problem with the receive magazine described in the Vanuous et al patent is that sheets of different sizes stack in different directions. This causes increased shearing contact between sheets of different sizes as they are dropped into the magazine. Increased shearing contact means increased static electricity problems and greater humidity dependence. Another problem with the receive magazine described in the Vanuous et al patent is that the received sheets have inflection points reducing the beam strength of the received sheets. Generally, the receive magazine described in the Vanuous et al patent has a capacity of about 30 sheets.

SUMMARY OF THE INVENTION

The present invention provides an improved receive magazine for photographic film, paper or other media adapted to receive such media in a near vertical orientation. The receive magazine of the present invention provides a significantly increased capacity to around 100 to 150 sheets while maintaining the same overall magazine volume and temperature/humidity constraints. Preferably, all sheets in the magazine of the present invention stack in the same direction and have no inflection points. Not only does this significantly increase the capacity of the receive magazine but it also allows different sizes of media to be received on a random basis.

Sheets received in the magazine of the present invention have a reduced shearing contact with adjacent sheets as the sheets drop into the stack region of the receive magazine. The minimized shearing contact creates less opportunity for the media to be marked or jammed via (1) static attraction (under low humidity conditions) or (2) adhesion, e.g., emulsion adhesion (at high humidity).

One embodiment of the present invention provides a receive magazine configured to be positioned in a generally upright, vertical orientation for passively collecting a plurality of flexible sheets of media. An elongated, vertically oriented enclosure has front and back walls, top and bottom walls, and first and second end walls. The top wall of the enclosure has a collection door through which the sheets of media are passively received within the magazine. A contoured plate is contained within the enclosure. The plate is hinged along a hinge line near the collection door on a non-stacked side of the enclosure. The plate is planar near the hinge line and is non-planar at an end of the plate opposite from the hinge line. A biasing mechanism is positioned near the collection door for resiliently biasing the plurality of flexible sheets of media laterally toward the non-stacking side of the enclosure. The end of the plate opposite from the hinge line is resiliently biased away from the non-stacking side of the enclosure toward a stacking side of the enclosure. Thus, the plurality of flexible sheets of media can be passively received through the collection door, can contact the plate and can stack on the stacking side of the enclosure with a stack of the plurality of flexible sheets of media being contoured as determined by the non-planar portion of the contoured plate.

In another embodiment, the present invention provides a receive magazine configured to be positioned in a generally upright, vertical orientation for passively collecting a plurality of flexible sheets of media. An elongated, vertically oriented enclosure has front, back and bottom walls the elongated, vertically oriented enclosure having a top opening through which the sheets of media are passively received within the magazine. A contoured plate is contained within the enclosure, the plate being hinged along a hinge line near the top opening on a non-stacked side of the enclosure, the plate being planar near the hinge line and being non-planar at an end of the plate opposite from the hinge line. Biasing means is positioned near the top opening for resiliently biasing the plurality of flexible sheets of media laterally toward the non-stacking side of the enclosure. The end of the plate opposite from the hinge line is resiliently biased away from the non-stacking side of the enclosure toward a stacking side of the enclosure. Whereby the plurality of flexible sheets of media are passively received through the top opening contacts the plate and stack on the stacking side of the enclosure with a stack of the plurality of flexible sheets of media being contoured as determined by the non-planar portion of the contoured plate.

Preferably, the magazine is light-tight. In a preferred embodiment, the contoured plate has a center vertical bend between two generally planar portions. In a preferred embodiment, the center vertical bend of the contoured plate makes the contoured plate convex from the stacking side of the enclosure. In a preferred embodiment, the front wall is openable to remove the plurality of flexible sheets of media from the receive magazine. In a preferred embodiment, a compression spring is positioned between the contoured plate and non-stacking side of the enclosure. In a preferred embodiment, the biasing means comprises a plastic spring.

BRIEF DESCRIPTION OF THE DRAWINGS

The foregoing advantages, construction and operation of the present invention will become more readily apparent from the following description and accompanying drawings in which:

FIG. 5 is a cross-section view of an empty receive magazine of FIG. 2 taken along cross-section line 4—4;

FIG. 6 is a cross-section view of a receive magazine of FIG. 2 containing sheets of media of a relatively small size taken along cross-section line 4—4;

FIG. 7 is a cross-section view of a receive magazine of FIG. 2 containing sheets of media of a relatively large size taken along cross-section line 4—4.

DETAILED DESCRIPTION OF THE PREFERRED EMBODIMENTS

Figure 1:
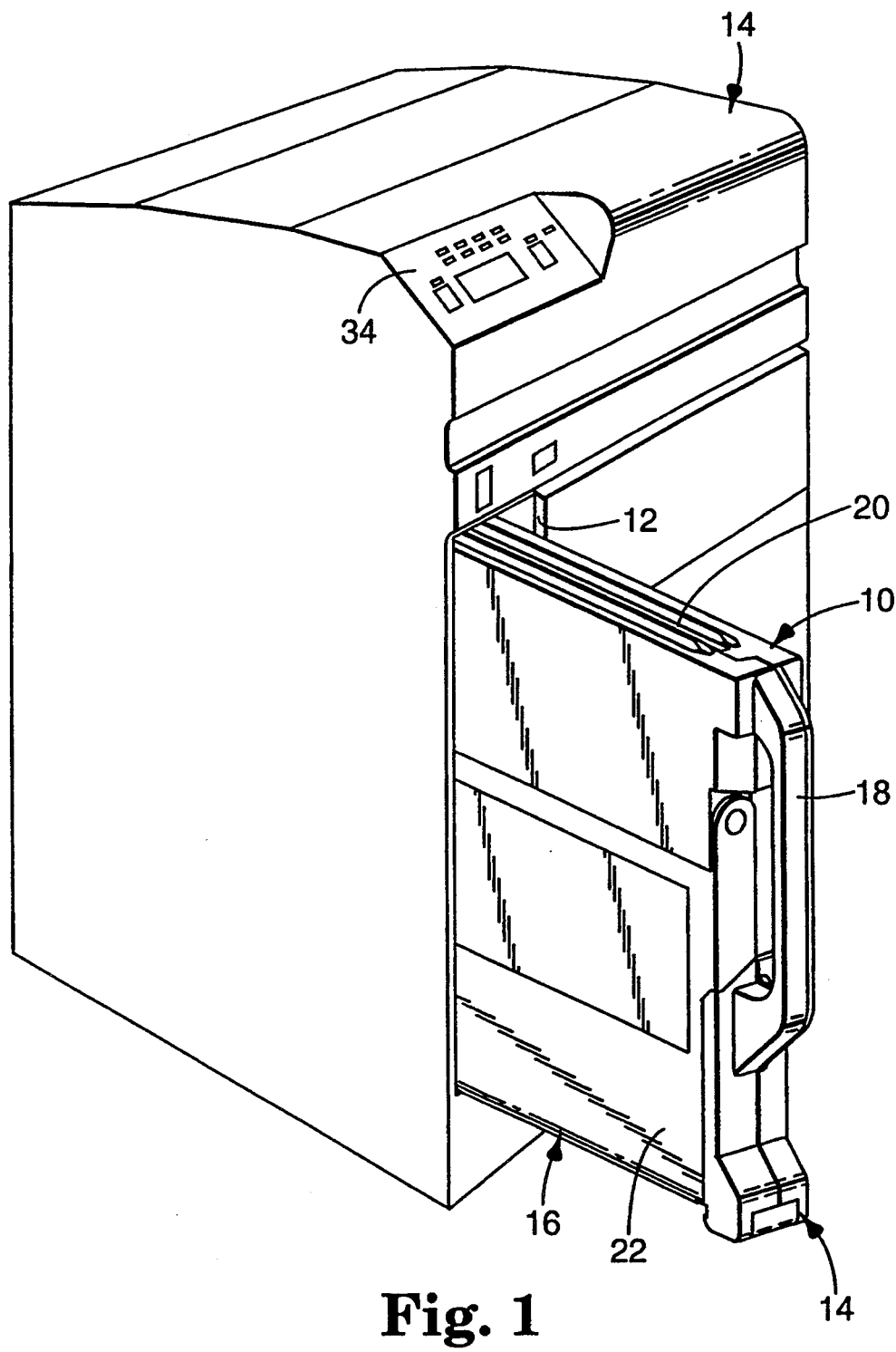
FIG. 1 is an isometric view of a receive magazine in accordance with the present invention partially loaded into a laser imager.

Receive magazine 10 is shown in FIG. 1 partially loaded into a magazine compartment 12 of a laser imager 14. Receive magazine 10 is a relatively inexpensive device used to collect, store and transport sheets of photographic media of varying sizes and types, e.g., film and paper, after the media has been imaged by laser imager 14. Receive magazine 10 includes a light-tight enclosure 16, handle 18, collection door 20 and retrieve door 22. Enclosure 16 has an elongated and relatively narrow footprint. Receive magazine 10 can be manually inserted into magazine compartment 12 in a vertical orientation with collection door 20 oriented upwardly.

Laser imager 14 is of conventional design. Although not shown in FIG. 1, laser imager 14 includes an electrical control subsystem with a collection door opening mechanism. When receive magazine 10 is properly loaded into magazine compartment 12, laser imager 14 is configured to open collection door 20. Imaged sheets of flexible media, such as film or paper, are directed to collection door 20 whereupon they are gravity fed, i.e., allowed to free-fall, into enclosure 16. When receive magazine 10 is full or whenever desired, receive magazine 10 may be removed from laser imager 14, generally by operating a control on control panel 24 under normal office lighting. Collected sheets of media may then be removed from receive magazine 10 under safe light conditions by opening relatively large retrieve door 22.

Receive magazine 10 preferably operates with photographic film media, typically having a thickness of about 7 mils (177.8 micrometers).

Figure 2:
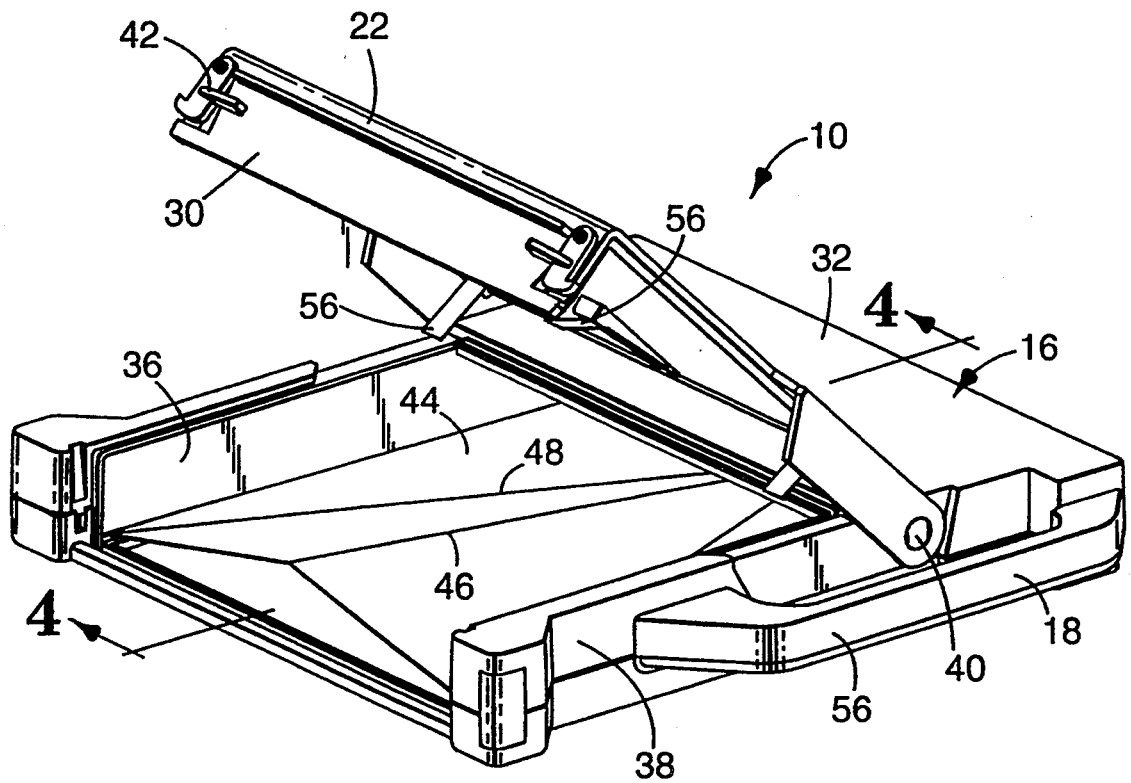
FIG. 2 is an isometric view of a receive magazine constructed in accordance with the present invention with the retrieve door partially opened.
Figure 3:
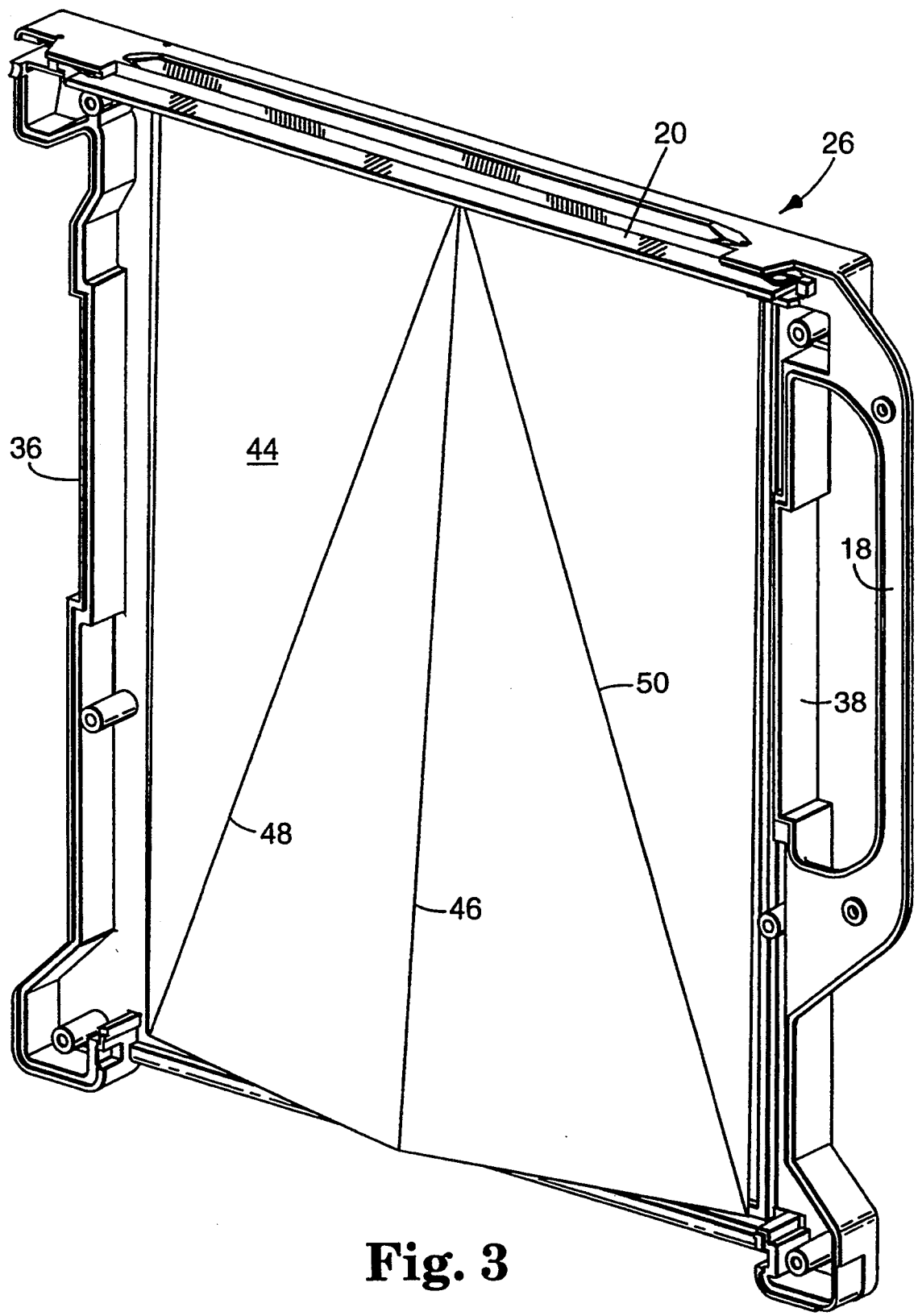
FIG. 3 is a top isometric view of the back portion of the receive magazine of FIG. 2.
Figure 4:
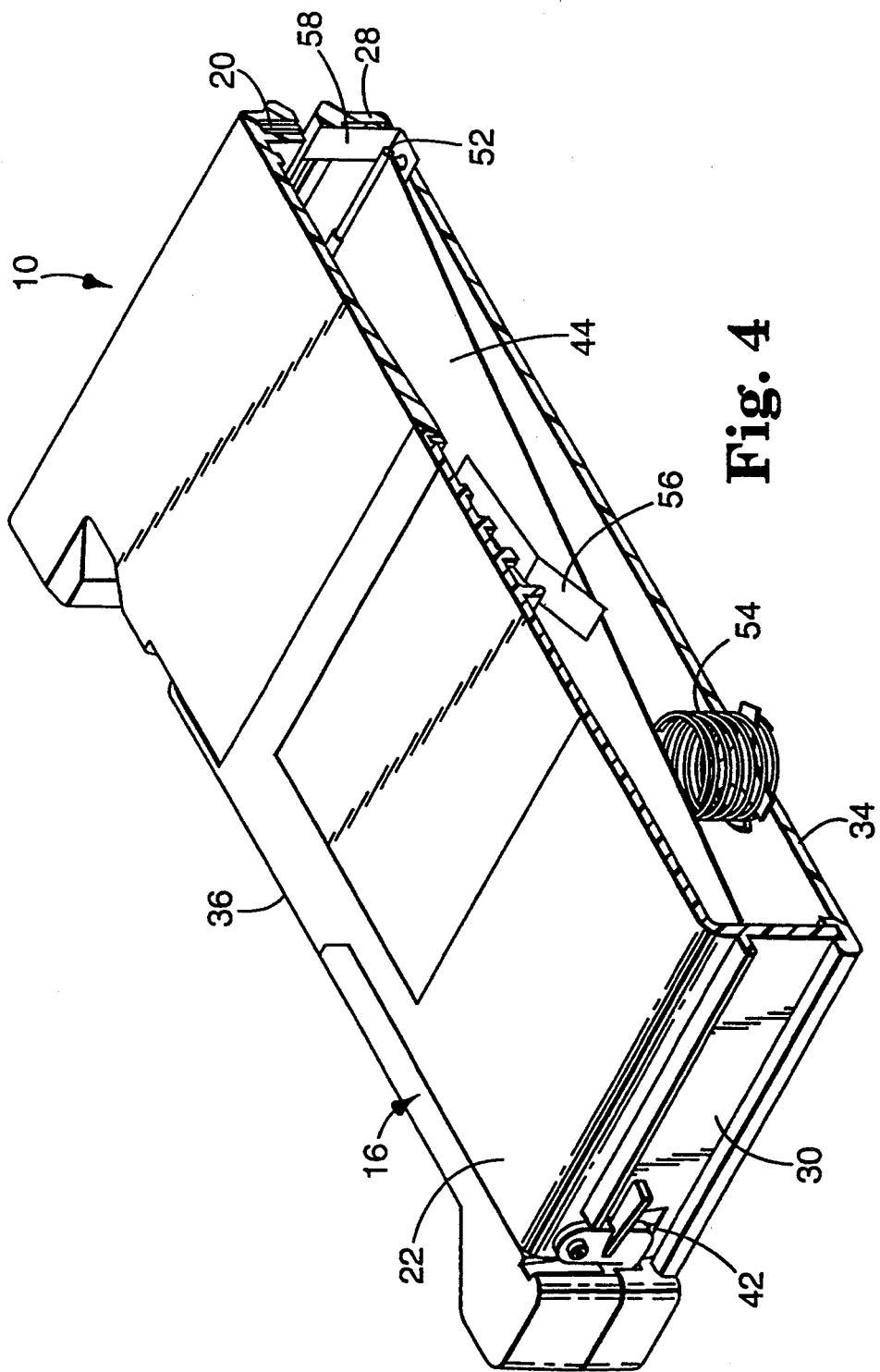
FIG. 4 is an isometric view of a cross-section of the receive magazine of FIG. 2 (retrieve door closed) taken along cross-section line 4—4.

Receive magazine 10 can be illustrated in greater detail by having reference to FIGS. 2-4.

FIG. 2 illustrates receive magazine 10 with retrieve door 22 partially open. In operation inside magazine compartment 12 of laser imager 14, retrieve door 22 would be fully closed. Retrieve door 22 is shown partially open in FIG. 2 in order to better illustrate the interior components of receive magazine 10.

FIG. 3 illustrates back portion 26 of receive magazine 10 only. The front portion (not shown) of receive magazine including retrieve door 22 has been completely removed for clarity in illustrating back portion 26.

FIG. 4 is a cross-section of receive magazine 10 sectioned through vertical plane 4—4 of FIG. 2 (with retrieve door 22 closed) to better illustrate the resilient biasing mechanisms contained within receive magazine 10.

Receive magazine consists of a light-tight enclosure 16 having top and bottom walls (28 and 30), front and back walls (32 and 34) and first and second side walls (36 and 38). With retrieve door 22 closed and collection door 20 closed, enclosure 16 protects contained sheets of photographic media in a light-tight manner. Generally, this means that sufficient ambient light is prevented from entering enclosure 16 to sufficiently protect the contained photographic media during the normal time in which such media is contained within receive magazine 10 in the ambient light environment in which receive magazine 10 is used. Retrieve door 22 pivots on hinge 40 and is secured by latch 42.

In general, sheets of flexible media are passively received within receive magazine 10 through collection door 20. The sheets of flexible media stack in one direction against front wall 32 of enclosure 16. Thus, front wall 32 becomes the stacking side of receive magazine 10.

Contoured plate 44 is vertically positioned within enclosure 16. Contoured plate generally has a contour about a vertical axis within receive magazine 10. Contoured plate 44 may be constructed from a planar, rectangular sheet of stock, preferably aluminum, A center bend 46 makes contoured plate 44 convex with respect the stacking side of receive magazine 10. In order to enable contoured plate 44 to be constructed from a planar rectangular piece of stock material, contoured plate contains two additional bends (48 and 50). Bends 48 and 50 compensate for bend 46 making the outer portions of contoured plate 44 planar with respect to each other. Bends 48 and 50 are angled to come together, or nearly together, at the point where bend 46 meets the top of contoured plate 44. Bends 48 and 50 are diagonal extending to the lower outside corners, respectively, of contoured plate 44.

Contoured plate 44 forms a raised center portion while maintaining a linear, planar top edge. The top edge of contoured plate 44 is hingedly connected to top wall 28 of enclosure 16. Hinge 52, positioned to the rear of collection door 20, allows contoured plate 44 to pivot along a horizontal plane at the top of contoured plate 44. Contoured plate 44 is resiliently biased toward front wall 28 by spring 54.

Contoured plate 44 maximizes the beam strength of stacked sheet media and predetermines the direction of stacking of the sheet media. Sheet media will always stack on plate 44 nearer to front wall 32 of receive magazine 10.

Plastic spring members 56 (one shown in FIG. 4), preferably three, engage sheet media falling into receive magazine 10 and force such sheet media toward the rear of enclosure 16. An additional spring member 58 located in enclosure 16 near collection door 20 prevents head to tail contact between the stack of sheet media already contained in receive magazine 10 and an entering sheet of media.

Preferably, receive mechanism 10 is constructed to accept sheet material having a maximum size of 14 inches (35.6 centimeters) by 17 inches (43.2 centimeters). So constructed, receive mechanism 10 may also randomly accept sheet material having sizes of 11 inches (27.9 centimeters) by 14 inches (35.6 centimeters) and 8 inches (20.3 centimeters) by 10 inches (25.4 centimeters). Bends 46, 48 and 50 allow contoured plate 44 to form a raised center portion approximately 40 millimeters high.

FIGS. 5, 6 and 7 are cross-sectional views of receive magazine 10 taken vertically through a plane extending front to back through the middle of receive magazine 10 (section line 4—4). FIGS. 5, 6 and 7 illustrate the manner in which sheet media is stacked and contained within receive magazine 10.

FIG. 5 illustrates an empty receive magazine 10. Collection door 20 is at the top ready to receive sheets. Contoured plate 44 is resiliently biased with spring 54 toward front wall 32. Spring members 56 are ready to contact incoming sheets.

FIGS. 6 and 7 illustrate a receive magazine 10 which has been partially filled with sheets 60 of photographic film of a relatively small size, e.g., 11 inches (27.9 centimeters) by 14 inches (35.6 centimeters) (FIG. 6) or of a relatively large size, e.g. 14 inches (35.6 centimeters) by 17 inches (43.2 centimeters). All of sheets 60 stack toward front wall 32. All of sheets 60 are forced to contour along contoured plate 44 by spring members 56. As additional sheets 60 are passively fed into receive magazine 10, contoured plate 44 is forced toward back wall 34 creating additional space for additional sheets 60. Thus, all sheets 60 are properly contoured and a significantly amount space is created to allow entry of further sheets 60. Sheets 60 of small and large size can easily be intermixed in any order. As additional sheets 60 are dropped into enclosure 16, spring 54 is further compressed by a prying force imparted by the dropping of sheets 60 rather than the weight of the stack of received sheets 60.

Figure 8:
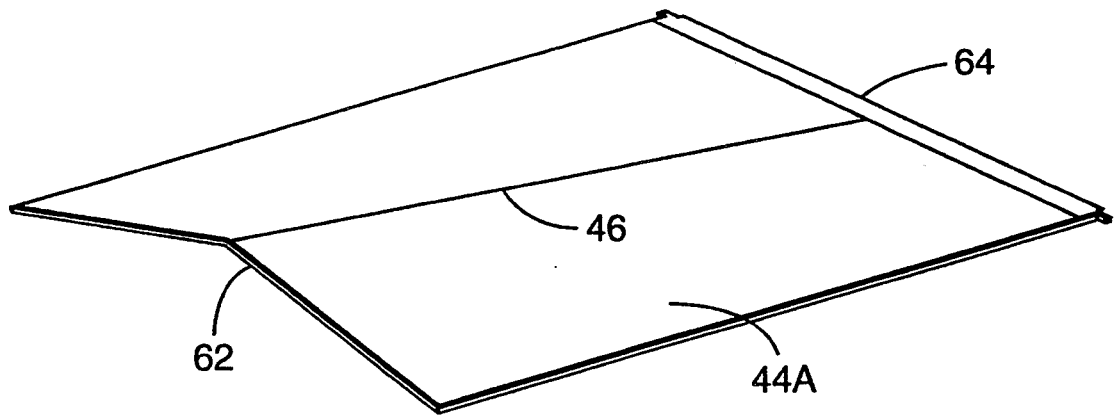
FIG. 8 is an isometric view of an alternative embodiment of a contoured plate usable in the receive magazine of the present invention.

FIG. 8 illustrates an alternative construction of contoured plate 44A which maintains center bend 46. While contoured plate 44 had additional outside bends 48 and 50, contoured plate 44A has no other discrete bends. Outside bends 48 and 50 in plate 44 were primarily included to allow plate 44 to be fabricated from a single sheet of stock material without the need for expensive tooling. Contoured plate 44A maintains center bend 46 being non-planar at end 62 but is still planar and linear at end 64. In order to maintain the linearity of end 64, plate 44A should be stamped out of stock material using special tooling somewhat increasing the difficulty of fabricating plate 44A.

While shown and described in connection with the reception and collection of photographic media such as film or paper, it is to be recognized and understood that the present invention has utility and is usable in other vertically oriented sheet stacking applications such as vertical collator applications which are not necessarily light-tight.

Thus, it can be seen that there has been shown and described a novel near vertical media receive magazine. It is to be recognized and understood, however, that various changes, modifications and substitutions in the form and the details of the present invention may be made by those skilled in the art without departing from the scope of the invention as defined by the following claims.

What is claimed is:

1. A receive magazine configured to be positioned in a generally upright, vertical orientation for passively collecting a plurality of flexible sheets of media, comprising:
   an elongated, vertically oriented enclosure having front and back walls, top and bottom walls, and first and second end walls;
   said top wall of said enclosure having a collection door through which said sheets of media are passively received within said magazine;
   a contoured plate contained within said enclosure, said plate being hinged along a hinge line near said collection door on a non-stacked side of said enclosure, said plate being planar near said hinge line and being non-planar at an end of said plate opposite from said hinge line; and
   biasing means positioned near said collection door for resiliently biasing said plurality of flexible sheets of media laterally toward said non-stacking side of said enclosure;
   said end of said plate opposite from said hinge line being resiliently biased away from said non-stacking side of said enclosure toward a stacking side of said enclosure;
   whereby said plurality of flexible sheets of media being passively received through said collection door contacts said plate and stacks on said stacking side of said enclosure with a stack of said plurality of flexible sheets of media being contoured as determined by said non-planar portion of said contoured plate.

2. A receive magazine as in claim 1 wherein said contoured plate has a center vertical bend between two generally planar portions.

3. A receive magazine as in claim 2 wherein said center vertical bend of said contoured plate makes said contoured plate convex from said stacking side of said enclosure.

4. A receive magazine as in claim 1 wherein said elongated, vertical oriented enclosure is light-tight.

5. A receive magazine as in claim 4 wherein said contoured plate has a center vertical bend between two generally planar portions.

6. A receive magazine as in claim 5 wherein said center vertical bend of said contoured plate makes said contoured plate convex from said stacking side of said enclosure.

7. A receive magazine as in claim 6 wherein said front wall is openable to remove said plurality of flexible sheets of media from said receive magazine.

8. A receive magazine as in claim 7 which further comprises a compression spring positioned between said contoured plate and non-stacking side of said enclosure.

9. A receive magazine as in claim 8 wherein said biasing means comprises a spring.

10. A receive magazine configured to be positioned in a generally upright, vertical orientation for passively collecting a plurality of flexible sheets of media, comprising:
    an elongated, vertically oriented enclosure having front, back and bottom walls said elongated, vertically oriented enclosure having a top opening through which said sheets of media are passively received within said magazine;
    a contoured plate contained within said enclosure, said plate being hinged along a hinge line near said top opening on a non-stacked side of said enclosure, said plate being planar near said hinge line and being non-planar at an end of said plate opposite from said hinge line; and
    biasing means positioned near said top opening for resiliently biasing said plurality of flexible sheets of media laterally toward said non-stacking side of said enclosure;
    said end of said plate opposite from said hinge line being resiliently biased away from said non-stacking side of said enclosure toward a stacking side of said enclosure;
    whereby said plurality of flexible sheets of media being passively received through said top opening contacts said plate and stacks on said stacking side of said enclosure with a stack of said plurality of flexible sheets of media being contoured as determined by said non-planar portion of said contoured plate.

11. A receive magazine as in claim 10 wherein said contoured plate has a center vertical bend between two generally planar portions.

12. A receive magazine as in claim 11 wherein said center vertical bend of said contoured plate makes said contoured plate convex from said stacking side of said enclosure.

13. A receive magazine as in claim 10 wherein said elongated, vertical oriented enclosure is light-tight.

14. A receive magazine as in claim 13 wherein said contoured plate has a center vertical bend between two generally planar portions.

15. A receive magazine as in claim 14 wherein said center vertical bend of said contoured plate makes said contoured plate convex from said stacking side of said enclosure.

16. A receive magazine as in claim 15 wherein said front wall is openable to remove said plurality of flexible sheets of media from said receive magazine.

17. A receive magazine as in claim 16 which further comprises a compression spring positioned between said contoured plate and non-stacking side of said enclosure.

18. A receive magazine as in claim 17 wherein said biasing means comprises a spring.

* * * * *